(12) United States Patent
Hanasaki

(10) Patent No.: US 6,659,625 B2
(45) Date of Patent: Dec. 9, 2003

(54) CAR LIGHTING FIXTURE LENS STRUCTURE AND MANUFACTURING METHOD THEREOF

(75) Inventor: Shingo Hanasaki, Isehara (JP)

(73) Assignee: Ichikoh Industries, Ltd., Tokyo (JP)

(*) Notice: Subject to any disclaimer, the term of this patent is extended or adjusted under 35 U.S.C. 154(b) by 0 days.

(21) Appl. No.: 09/814,984

(22) Filed: Mar. 23, 2001

(65) Prior Publication Data

US 2001/0028569 A1 Oct. 11, 2001

(30) Foreign Application Priority Data

Mar. 24, 2000 (JP) .................................. 2000-085263

(51) Int. Cl.[7] .............................................. B32B 27/30
(52) U.S. Cl. ..................... 362/311; 362/310; 428/423.1; 428/412
(58) Field of Search .................. 362/520, 310, 362/311, 326; 264/259, 268, 269; 313/635, 489; 445/8; 428/412, 423.1

(56) References Cited

U.S. PATENT DOCUMENTS

| | | | | |
|---|---|---|---|---|
| 4,010,311 A | * | 3/1977 | Lewis et al. | 428/424 |
| 4,563,730 A | | 1/1986 | Saito | 362/264 |
| 4,666,758 A | * | 5/1987 | Hunter et al. | 428/212 |
| 4,719,146 A | * | 1/1988 | Hohage et al. | 428/331 |
| 5,063,112 A | * | 11/1991 | Gross et al. | 428/412 |
| 5,114,792 A | * | 5/1992 | McWilliams et al. | 428/422 |
| 5,232,637 A | * | 8/1993 | Dasher et al. | 264/1.3 |
| 5,558,431 A | * | 9/1996 | Wilson | 362/376 |
| 5,665,436 A | | 9/1997 | Chitarra et al. | 427/558 |
| 6,156,436 A | * | 12/2000 | Joseph et al. | 428/424.4 |
| 6,179,456 B1 | * | 1/2001 | Nakamura et al. | 362/510 |
| 6,265,061 B1 | * | 7/2001 | Kang et al. | 428/323 |
| 6,296,732 B1 | * | 10/2001 | Enlow et al. | 156/209 |
| 6,328,446 B1 | * | 12/2001 | Bhalakia et al. | 351/163 |

FOREIGN PATENT DOCUMENTS

| | | |
|---|---|---|
| DE | 3810096 A1 | 10/1989 |
| EP | 0 939 109 A1 | 9/1999 |
| GB | 1 487 529 | 10/1977 |
| GB | 2 216 136 A | 10/1989 |
| JP | 10-158420 | 6/1998 |
| JP | 10-282889 | 10/1998 |
| JP | 2000-331525 | 11/2000 |
| JP | 2001-052512 | 2/2001 |
| SE | wo 99/42324 A | * 8/1999 ....... 427/558 |
| WO | 99/42324 | 8/1999 |

OTHER PUBLICATIONS

Patent Abstracts of Japan, 03123677 (May 27, 1991), Abstract of Tetsuya Koshoji, Light Pervious Molded Product, 01–257827 Oct. 4, 1989).

Patent Abstract of Japan, 07108560 (Apr. 25, 1995), Abstract of Masami Suzuki, Manufacturing of Lighting Equipment Lens, 05–253227 (Oct. 8, 1993).

* cited by examiner

Primary Examiner—Thomas M. Sember
Assistant Examiner—Anabel Ton
(74) Attorney, Agent, or Firm—Foley & Lardner

(57) ABSTRACT

A car lighting fixture lens structure comprising: a lens body molded of a transparent resin material and attached to cover an opening of a lamp housing; and a transparent protective film laminated and formed on an outer surface of this lens body, the lens body being molded of a transparent thermoplastic resin material, and said transparent protective film being molded of a thermoplastic polyurethane.

7 Claims, 3 Drawing Sheets

CAR LIGHTING FIXTURE LENS STRUCTURE AND MANUFACTURING METHOD THEREOF

BACKGROUND OF THE INVENTION i) Field of the Invention

The present invention relates to a car lighting fixture lens structure applied, for example, as an outer lens of a car head lamp, and a manufacturing method of the structure.

ii) Description of the Related Art

In general, this type of car lighting fixture lens structure is constituted of a lens body molded of a transparent resin material and attached to cover an opening of a lamp housing, and a transparent protective film laminated and formed on the outer surface of this lens body.

Specifically, the conventional car lighting fixture lens structure is provided with the lens body and a hard coat which functions as a protective film on the outer surface of the lens body.

Generally in this type of an apparatus for a car, a chamber is defined by a resin molded lens and housing. Moreover, a lens surface (the outer surface of the lens opposite to the inner surface disposed opposite to the chamber) is subjected to a hard coat treatment, that is, coated in order to protect the lens.

In a conventional apparatus for the car, since the lens surface is subjected to the hard coat treatment, the lens is easily damaged, broken, and attacked by chemicals. Moreover, lens broken pieces are sometimes scattered during lens breakage, and a problem also lies in adhesion to the lens. Furthermore, since a coating process is necessary, a problem also lies in productivity, and a facilities expense is high. Additionally, since organic solvents are used, an environmental problem also occurs.

Since polycarbonate having a molecular weight of 21000 to 25000 is used in a conventional lens body, a thickness of the lens body is of the order of 2.5 to 5 mm considering molding properties. The lens body is thus structured not to easily break.

Furthermore, for a purpose of securely preventing the lens broken pieces from being scattered during the lens breakage, the present applicant has filed an application of an invention in which the lens surface is doped with a thermoplastic urethane skin layer superior in elasticity (Japanese Patent Publication No. 2000-331525, filed on May 20, 1999, and laid open on Nov. 30, 2000).

However, the conventional lens body is formed not to easily break in this manner, and therefore it would fail to break when a predetermined impact at a traffic accident or the like is added. In consequence, a stress generated in the lens by the impact was difficult to be relieved.

SUMMARY OF THE INVENTION

An object of the present invention is to provide a car lighting fixture lens structure which can break under impact and relieve stress.

Another object of the present invention is to provide a manufacturing method of a car lighting fixture lens structure, in which formation can easily be performed without causing a high rise in a facilities expense or shape limitation of a lens body.

In order to achieve the aforementioned objects, according to the present invention, there is provided a car lighting fixture lens structure comprising: a lens body attached to cover an opening of a lamp housing and formed of a transparent resin material; and a transparent protective film laminated and formed on an outer surface of the lens body, the lens body is formed of a transparent thermoplastic resin material, and the transparent protective film is molded of a thermoplastic polyurethane.

According to the present invention, since the protective film is formed with the thermoplastic polyurethane, it is possible to protect the lens body from chipping, damage and breakage of an impact system by sand or the like, corrosion by a chemical, and the like.

Moreover, according to the present invention, since the protective film is formed with the thermoplastic polyurethane, it is possible to effectively prevent a broken piece from flying/scattering during lens body breakage.

Furthermore, according to the present invention, since the lens body breaks, it is possible to relieve stress generated by impact.

Additionally, according to the present invention, since the lens body and protective film are both formed of the thermoplastic resin material, recycling, for example, remolding of the lens structure is possible.

The car lighting fixture lens structure of the present invention is constituted in such a manner that the lens body is formed of a polycarbonate and the protective film is formed of an aliphatic thermoplastic urethane.

According to the present invention, since the aliphatic thermoplastic urethane superior particularly in wear resistance, strength, chemical resistance, and weathering resistance among thermoplastic elastomers is used to form the protective film, the lens body is effectively protected from the chipping, damage and breakage of the impact system by sand or the like, corrosion by the chemical, and the like.

Moreover, according to the present invention, since the aliphatic thermoplastic urethane is satisfactory in adhesion to the polycarbonate, the protective film of the aliphatic thermoplastic urethane can be formed to sufficiently adhere to the polycarbonate lens body. This can effectively prevent the broken piece from flying/scattering during lens body breakage.

The present invention is characterized in that the lens body is formed by disposing a character line of a groove portion dug in a thickness direction.

According to the present invention, when the stress is generated on the surface of the lens structure by the impact from the outside, the stress is concentrated on a portion with the character line formed therein and the lens body can easily be broken. This can relieve the stress generated in the lens body.

Moreover, according to the present invention, by appropriately selecting a character line sectional shape, forming depth and forming place to form the line, it is possible to control a breakage start point of the lens body during loading of the stress.

The present invention is characterized in that a molecular weight of the polycarbonate is 20000 or less.

According to the present invention, since the polycarbonate having a molecular weight of 20000 or less is used, and fluidity during injection into the metal mold is high, a lens with small thickness can be molded, therefore cost reduction can be realized. Moreover, since this polycarbonate has a low impact strength, breakage occurs under a predetermined impact. Therefore, when the impact of a traffic accident or the like is applied to the lens body formed by the polycarbonate, the lens breaks and it is possible to relieve the stress generated by the impact.

The present invention is characterized in that the lens structure is formed by a film in-mold molding method of injecting a polycarbonate in a metal mold with an aliphatic thermoplastic urethane film being set therein.

According to the present invention, it is possible to easily form the protective film of the aliphatic thermoplastic urethane film on the outer surface of the lens body of a polycarbonate with a sufficient adhesion force by the film in-mold molding method in which no organic solvent is used.

According to the present invention, the aliphatic thermoplastic urethane film is flexible, and high in follow-up property to the metal mold shape, and this enables three-dimensional shape in-mold molding which has been impossible with a hard coat sheet.

According to the present invention, since the lens structure is formed by the film in-mold molding method of injecting the polycarbonate in the metal mold with the aliphatic thermoplastic urethane film being set therein, the lens structure can easily be molded without causing deterioration of environment by the organic solvent, high rise of the facilities expense, or shape limitation of the lens body.

The present disclosure relates to subject matter contained in Japanese Patent Application No. 2000-85263, filed on Mar. 24, 2000, the disclosure of which expressly incorporated herein by reference in its entirety.

DETAILED DESCRIPTION OF THE INVENTION

Figure 1:
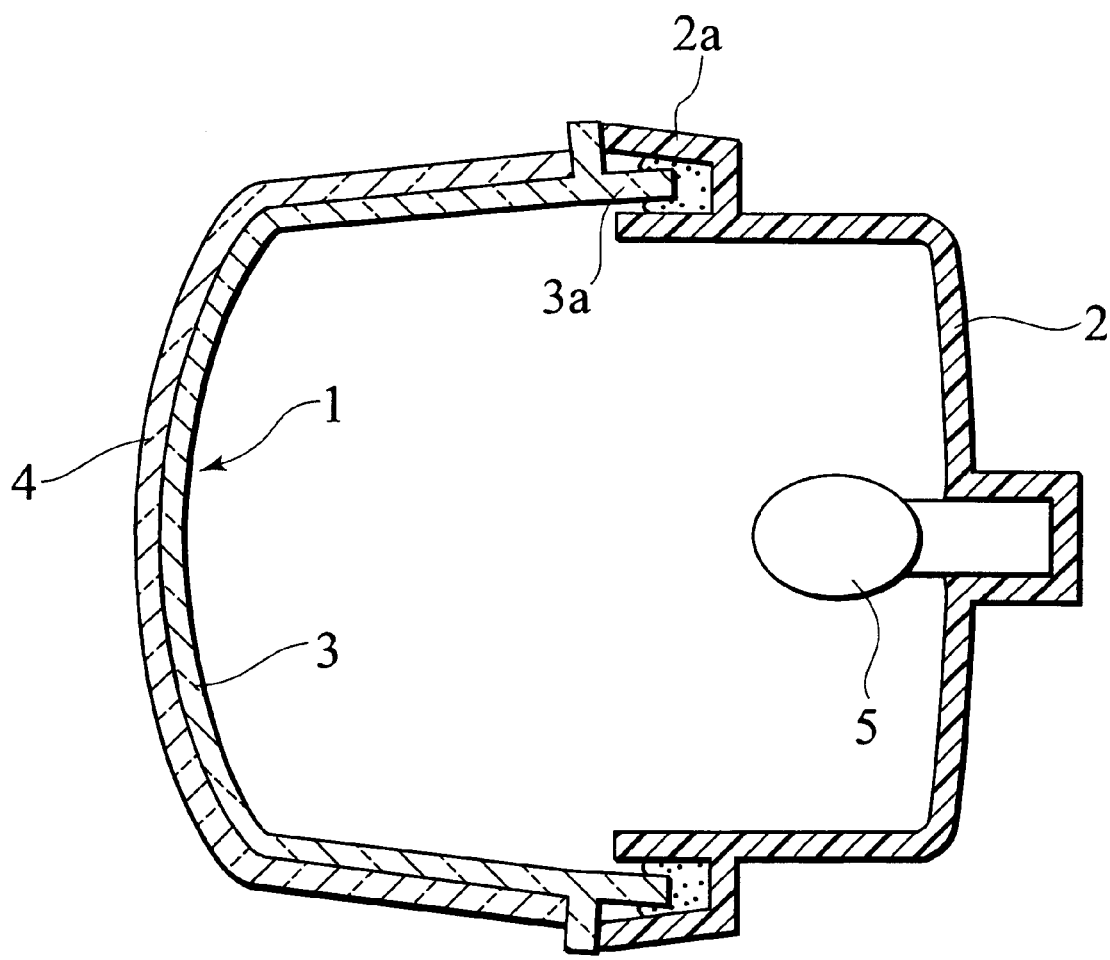
FIG. 1 is a schematic sectional view of a car lighting fixture to which a lens structure of the present invention is applied.

The lens structure is constituted of a lens body attached to cover an opening of a lamp housing formed of a transparent resin material, and a transparent protective film laminated and formed on an outer surface of the lens body.

Further, the lens body may have a stress relieving function. The stress relieving function is a portion such that the stress is concentrated in and the lens body can easily be broken, when the stress is generated on the surface of the lens structure by the impact from the outside. The stress relieving function may be, for example, a groove(s) and a thin portion(s). When impact is added to the surface of the lens structure from the outside, stress is concentrated in a portion in which the stress relieving function is formed. Moreover, by the stress concentrated on the formed portion, the lens body easily breaks, and the stress is relieved. Moreover, the stress relieving function can be formed by appropriately selecting a sectional shape, size and place. This can control a breakage start point of the lens body during stress loading. Moreover, by appropriately changing a set position of the character line, destruction can be performed from a safe place.

Furthermore, since the stress relieving structure by the stress relieving function can be formed without requiring a special process or material, cost increase fails to be incurred.

The lens body is formed by a transparent thermoplastic resin material, such as a polycarbonate(PC), acryl resin (PMMA), cyclolefinpolymer (PMMA) and transparent polyamide (PA), preferably, a polycarbonate. The molecular weight of a polycarbonate is preferably 20,000 or less, more preferably, 15,000–20,000, considering resin properties.

Examples of the polycarbonate include, though not restrictive, ML400R (product name, MITSUBISHI ENGINEERING PLASTICS Ltd, average molecular weight:19,000) and LEXAN LSHF (product name, NIPPON GE PLASTICS Ltd, average molecular weight:19,000).

Additives such as a pigment, an antistatic agent and a release agent may be arbitrarily added.

The transparent protective film is formed of a thermoplastic resin, preferably an aliphatic thermoplastic urethane. An aliphatic thermoplastic urethane forming the transparent protective film is superior particularly in wear resistance, strength, chemical resistance, and weathering resistance among thermoplastic elastomers. Therefore, the lens body with the protective film formed on the surface thereof is effectively protected from chipping, damage and breakage of an impact system by sand or the like, corrosion by chemicals such as an organic solvent, and the like.

Examples of the aliphatic thermoplastic urethane, though not restrictive, include CG60DV (product name, THERMEDICS Ltd,) and Pandex T-7890 (product name, DAINIPPON INK AND CHEMICALS LTD, hardness:98).

The lens thickness has preferably 1.5–2.5 mm, more preferably 1.5 mm approximately, considering easiness to break and economical reasons. A polycarbonate having a molecular weight of 20,000 or less, has a low viscosity, therefore, a lens with small thickness can be formed. And more, in such a case, the transparent protective lens thickness has preferably 0.8–1.5 mm, more preferably 1.2 mm approximately.

The aliphatic thermoplastic urethane and the polycarbonate have high adhesions to each other. Therefore, the protective film of the aliphatic thermoplastic urethane sufficiently adheres to the polycarbonate lens body and is laminated/formed. This can effectively prevent a broken piece of the lens body from flying/scattering during breakage of the lens body. Therefore, the lens structure can be constituted in such a manner that sufficient rigidity is maintained in a usual state, the structure easily breaks, for example, under a predetermined stress generated by an impact of traffic accident, and the stress can be relieved. This can further enhance safety property when the impact is added to the lens structure.

Moreover, since the aliphatic thermoplastic urethane and the polycarbonate are both thermoplastic, and have compatibility with each other, it is possible to reform or otherwise recycle the lens structure.

As the manufacturing method of the lens structure, manufacture may be performed by, though restrictive, a dope processing such as skin layer forming, an in-mold molding and a dipping processing. The in-mold molding method is known as disclosed in Japanese Patent Application Laid-Open No. 282889/1998. In the invention, a lens structure may be formed by a film in-mold molding method of injecting a polycarbonate in a metal mold in which an aliphatic thermoplastic urethane film is set.

Examples of the present invention will be described hereinafter with reference to the drawings.

EXAMPLE 1

FIG. 1 shows a car lighting fixture lens structure 1 as a first example. The lens structure 1 is constituted of a lens body 3 attached to cover an opening of a lamp housing 2 formed of a transparent resin material, and a transparent protective film 4 laminated and formed on an outer surface of the lens body 3.

The lens structure 1 is attached to the lamp housing 2 by inserting a leg portion 3a of the lens body 3 into an attachment groove portion 2a formed along an outer periphery of the opening of the lamp housing 2 and performing hot-melt adhesion. Additionally, numeral 5 denotes a light source such as a bulb in FIG. 1.

Here, the lens body 3 and the transparent protective film 4 have constant thickness in each other. The lens body 3 has 1.5 mm thickness, and the transparent protective film 4 has a 1.2 mm thickness.

And, the lens body 3 is formed by a polycarbonate, ML400R (product name, MITSUBISHI ENGINEERING PLASTIC Ltd, average molecular weight:19,000). The transparent protective film 4 is formed of an aliphatic thermoplastic urethane, CG60DV (product name, THERMEDICS Ltd,).

EXAMPLE 2

Figure 2A:
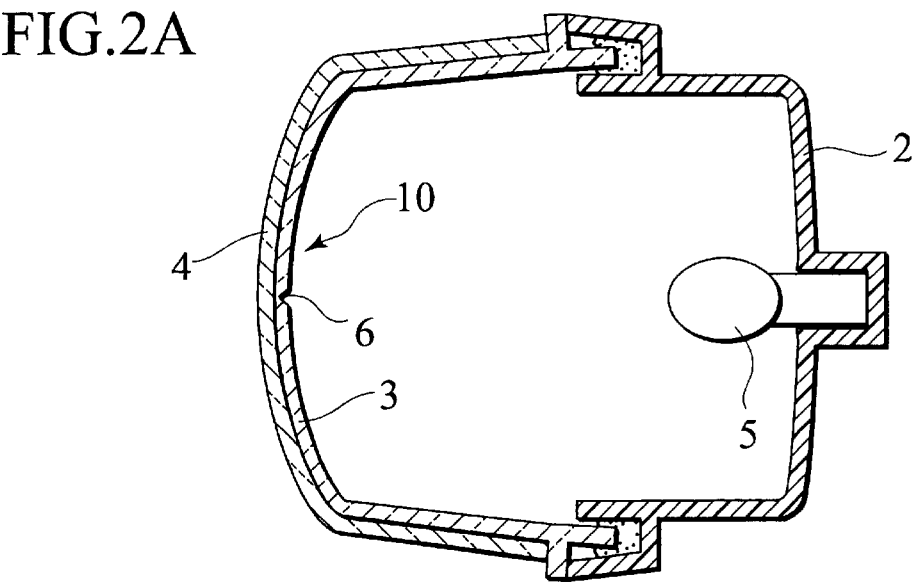
FIG. 2A is a schematic sectional view of the car lighting fixture showing a modified lens structure of the present invention.
Figure 2B:
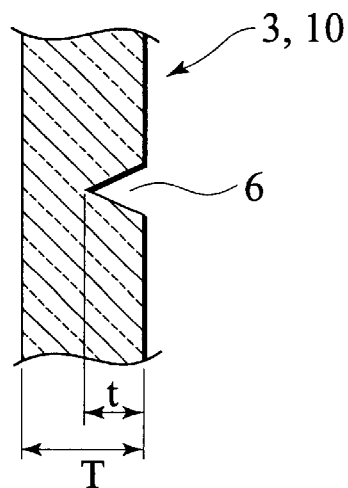
FIG. 2B is a main part enlarged sectional view of a lens body shown in FIG. 2A.
Figure 2C:
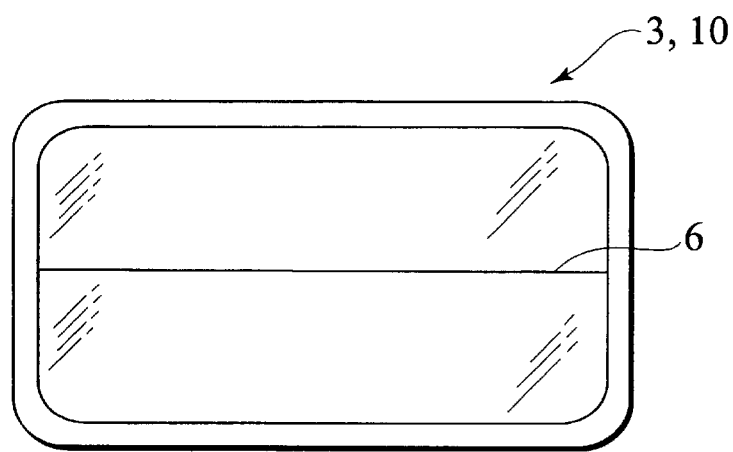
FIG. 2C is a front view of the lens body shown in FIG. 2B.

FIGS. 2A, 2B and 2C show a modified car lighting fixture lens structure 10 as a second example. This lens structure 10 differs only in that a character line 6 provided with a stress relieving function is disposed, and other structural elements are constituted similarly as the lens structure 1 shown in FIG. 1.

Specifically, the lens body 3 of the lens structure 10 is formed by disposing the character line 6 of a groove portion dug in a thickness direction.

In the present example, as shown in FIGS. 2B and 2C, the character line 6 is constituted by forming the groove portion with a V-shaped section reaching a depth t (=T/2) across a center portion of the lens body 3 with respect to a thickness T of the lens body 3.

In the lens structure 10 constituted in this manner, when impact is added to the surface of the lens structure 10 from the outside, stress is concentrated in a portion in which the character line 6 is formed. Moreover, by the stress concentrated on the formed portion, the lens body 3 easily breaks, and the stress is relieved.

EXAMPLE 3

Figure 3A:
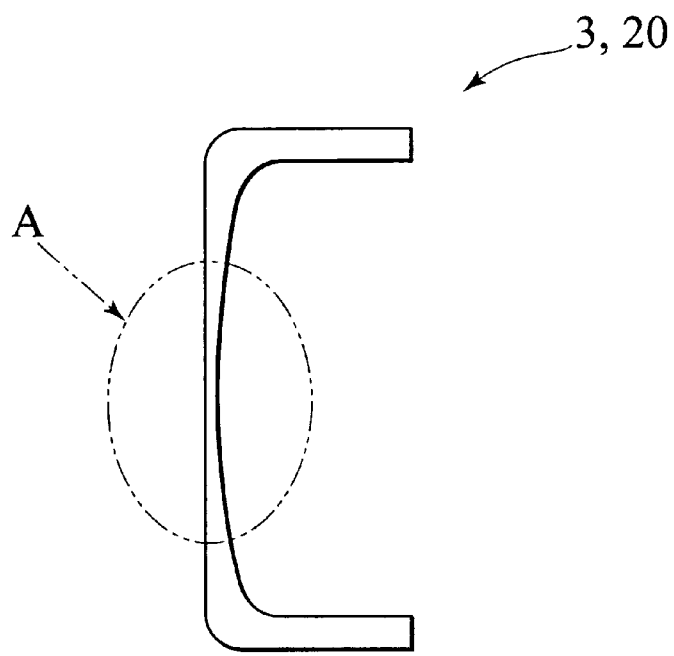
FIG. 3A is a sectional view of the lens body constituting a modified lens structure of the present invention.
Figure 3B:
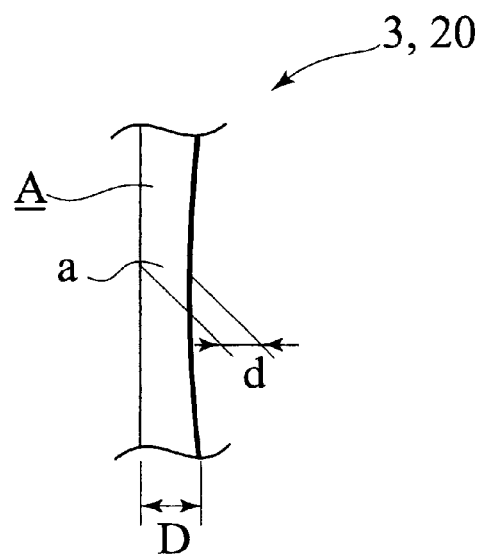
FIG. 3B is a main part enlarged sectional view of the lens body shown in FIG. 3A.

FIGS. 3A and 3B show a modified lens body 3 constituting a car lighting fixture lens structure 20 as a third example. The lens structure 20 differs only in that the lens body 3 is provided with another stress relieving structure, and other structural elements are constituted similarly as the lens body 1.

Specifically, the stress relieving structure of the lens body 3 in the present example is constituted of a thin portion A. The thin portion A is constituted of a thinnest portion a deforming when stress is generated in a lens by impact or the like, and a portion whose peripheral thickness gradually decreases toward the thinnest portion a. This constitution is shown in FIG. 3B. In the present example, the thin portion A is constituted of the thinnest portion a with a thickness d of 1.5 mm, and a peripheral portion with a thickness D of 2.5 mm, and is formed in a front center portion of the lens body 3.

According to the lens structure 20, when the impact is added from the outside, the stress is concentrated on the thin portion A, and the portion largely deforms or breaks. This can relieve the stress. Therefore, for the thin portion A, a size, number, set place, and the like can appropriately be designed in accordance with the stress for deformation and the shape or design of a product.

Moreover, in the stress relieving structure by the thin portion A, the entire structure fails to be thinned, and instead a part of the lens body is thinned. For this, the lens structure naturally has a necessary rigidity.

EXAMPLE 4

A manufacturing method of these lens structures 1, 10, 20 will next be described. In the manufacturing method, the lens structure 1, 10, 20 is formed by a film in-mold molding method of injecting a polycarbonate in a metal mold in which an aliphatic thermoplastic urethane film is set. The film in-mold molding method is known as disclosed in Japanese Patent Application Laid-Open No. 282889/1998.

Specifically, in the present example, first, to a cavity space between a male metal mold provided with an injection port and a female metal mold provided with a vent hole, the aliphatic thermoplastic urethane film is supplied only by a predetermined pitch. Subsequently, heating is performed to obtain a desired temperature, and the aliphatic thermoplastic urethane film is softened. Furthermore, the cavity space is deaerated through the vent hole disposed in the male metal mold, and the aliphatic thermoplastic urethane film is closely attached along a female metal mold cavity surface by air pressure. Thereby, the aliphatic thermoplastic urethane film is molded. Thereafter, a cavity is clamped and a polycarbonate is injected to the metal mold to perform molding. Thereby, the lens structure 1 (or 10, 20) provided with the protective film 4 of the aliphatic thermoplastic urethane film is obtained on the outer surface of the lens body 3 of the polycarbonate. The lens structure of the present invention formed in this manner is laminated/formed with a sufficient adhesion force.

It should be understood that the foregoing relates to only a preferred embodiment of the invention, and that it is intended to cover all changes and modifications of the example of the invention herein chosen for the purpose of the disclosure, which do not constitute departures from the spirit and scope of the invention.

What is claimed is:

1. A car lighting fixture lens structure comprising:
   a car tamp lens body formed of a transparent thermoplastic resin material and attached to cover an opening of a tamp housing, the transparent thermoplastic resin material comprising a potycarbonate having a molecular weight of 20000 or less so that the lens body easily breaks upon impact; and
   a transparent protective film formed on an outer surface of the lens body,
   said transparent protective film being formed of a thermoplastic polyurethane to prevent a broken piece of the lens body from flying or scattering.

2. The car lighting fixture lens structure according to claim 1, wherein said transparent protective film is formed of an aliphatic thermoplastic urethane.

3. The car lighting fixture lens structure according to claim 1, wherein said lens body comprises a character line comprising a groove portion dug in a thickness direction.

4. The car lighting fixture lens structure according to claim 2, wherein said lens body comprises a character line comprising a groove portion dug in a thickness direction.

5. A manufacturing method of the car lighting fixture lens structure according to claim 2, comprising steps of:

forming the lens structure by a film in-mold molding method of injecting a polycarbonate in a metal in which an aliphatic thermoplastic urethane film is set.

6. A manufacturing method of the car lighting fixture lens structure according to claim 3, comprising steps of:

forming the lens structure by a film in-mold molding method of injecting a polycarbonate in a metal mold in which an aliphatic thermoplastic urethane film is set.

7. A manufacturing method of the car lighting fixture lens structure according to claim 4, comprising steps of:

forming the lens structure by a film in-mold molding method of injecting a polycarbonate in a metal mold in which an aliphatic thermoplastic urethane film is set.

* * * * *